March 21, 1961  J. J. CHYLE  2,975,513
METHOD OF LINING
Filed Nov. 5, 1956

INVENTOR.
JOHN J. CHYLE
BY Andrus & Sceales
Attorneys

2,975,513
METHOD OF LINING

John J. Chyle, Wauwatosa, Wis., assignor to A. O. Smith Corporation, Milwaukee, Wis., a corporation of New York Filed Nov. 5, 1956, Ser. No. 620,376

2 Claims. (Cl. 29—471.1)

This invention relates to a method of welding a stainless steel liner sheet to a carbon steel base plate. This application is a continuation-in-part of application Serial No. 259,129, now abandoned, filed November 30, 1951, of the same inventor.

One object of the invention is to provide a method of welding a liner sheet to a base plate which provides a bond of greatly increased strength as compared to the bonds produced by former welded lining methods, thereby decreasing the danger of tearing and separation of the liner sheet from the base plate during and after fabrication of the resulting lined member into a pressure vessel or the like.

The method, in general, comprises coating by electrolytic deposition a layer of nickel or cobalt on one surface of a base plate and then welding a liner sheet to the coated base plate surface. Under the invention, the liner sheet has no coating of nickel or cobalt and is in direct engagement with the deposited layer, there being no nickel or cobalt interposed in sheet form between the base and liner members. The welding of the liner sheet to the base metal may be accomplished by electric resistance welding, such as spot welding or by means of heat, and pressure applied either by rolls or hydraulic or pneumatic means.

Other objects and advantages of the invention will be more fully set forth in the following description of an embodiment of the invention illustrated in the accompanying drawings.

Figure 1:
Figure 1 is a sectional view of a base plate portion having a coating of nickel or cobalt deposited thereon.

Referring to the drawings, the method of the invention is first illustrated as employed in the joining of a corrosion resistant metal liner sheet 1 to a relatively thick metal base plate 2 by spot welding in order to protect the latter from the corrosive effects of fluids to be contained within vessels fabricated from a plurality of members lined in accordance with the invention. This spot welding lining process has been found particularly useful due to the normally different coefficients of expansion of the liner and base member.

In practicing the method of the invention as applied to spot welding, the first step is to thoroughly clean one surface of the base plate 2, for example by suitable pickling processes. Immediately thereafter and before the cleaned surface has had an opportunity to oxidize the cleaned surface is coated with a thin layer 3 of nickel or cobalt. Preferably, the nickel or cobalt is coated on by electrolytic deposition which is continued until the layer 3 attains the desired thickness.

Figure 2:
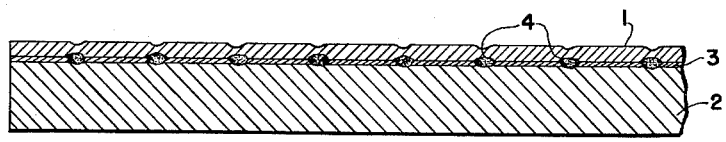
Fig. 2 is a corresponding section of the coated base plate portion of Fig. 1 after a liner sheet has been spot welded thereto.
Figure 3:
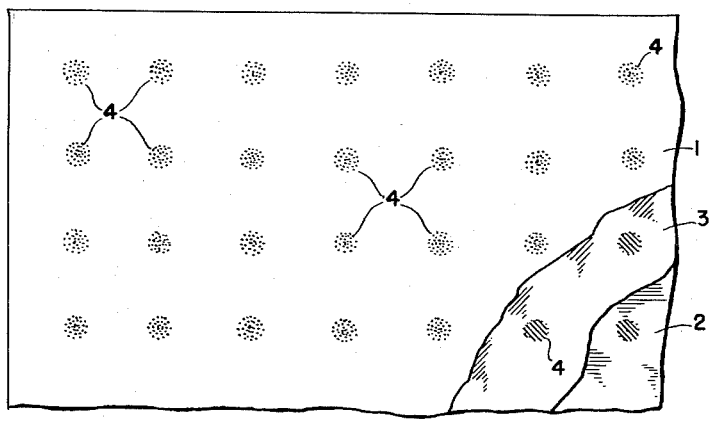
Fig. 3 is a top plan view of the showing of Fig. 2, with portions broken away to illustrate the structure.

The liner sheet 1 is also thoroughly cleaned and is placed in flatwise engagement with the plated surface of the base plate 2. The liner sheet and plated base plate are then united by a plurality of electric resistance spot welds 4 which are spaced at close and contiguous points as shown in Figs. 2 and 3.

During the spot welding operation the nickel or cobalt layer at the welds diffuses or alloys into the members being joined, so that the only nickel or cobalt plating present in the finished lined member is on the inner surface of the base plate between the various spot welds 4. This nickel or cobalt between the spot welds is beneficial in that it decreases the amount of corrosion which takes place in the event of circulation of corrosive fluids between the liner and base members.

Under the invention, the liner sheet 1 is not plated with nickel or cobalt and there is no nickel or cobalt sheet interposed between the liner and base members. This is because it has been discovered that the plating of the base plate, as described, results in a materially increased bond strength between the united parts whereas the use of nickel or cobalt either as a coating on the liner sheet or in sheet form does not have any beneficial effect upon the bond strength.

Referring particularly to the types of metals which it is desired to bond, the base plate 2 is formed of a suitable carbon steel and the liner sheet 1 may take the form of any one of the types of stainless steel or nickel, nickel alloys, copper and copper alloys.

Figure 4:
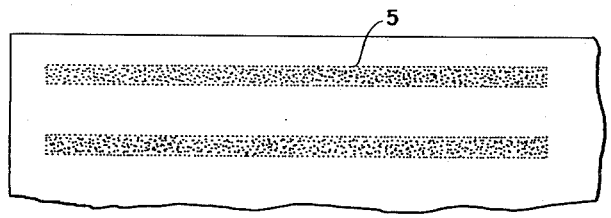
Fig. 4 is a view similar to Fig. 3 and illustrates another electric resistance welded structure.

The spot welds 4 are created by a series process wherein two roller electrodes are placed in engagement with the liner sheet 1 and connected for opposite polarity. During welding, current passes from one roller electrode through the liner sheet and base plate and into the other roller electrode, causing resistance heating at the interface portions adjacent the electrodes. It is also contemplated that sheet 1 may be welded to base plate 2 by electric resistance welding wherein the roller electrodes move in a fixed path to provide longitudinal extending welds 5 between the liner and base metal, as shown in Fig. 4.

As an example of a specific application of the invention, assume that it is desired to bond an AISI type 316 stainless steel sheet 3/16 of an inch in thickness to a carbon steel base plate 3/4 of an inch thick. After sand blasting of one surface of the base plate, the same is electroplated with nickel to a thickness of approximately .005 inch and placed in engagement with a cleaned liner sheet. Two disc or roller electrodes, each 40 inches in diameter and 1½ inches in thickness, are axially spaced three inches apart and with portions of their peripheries in engagement with the liner sheet. A preheating current of 30,000 amperes is then caused to pass between the electrodes and through the liner and base members for 1.8 seconds, with the pressure on each electrode being approximately 6,000 pounds. Immediately thereafter a welding current of 35,000 amperes is passed between the electrodes for a period of 1.4 seconds. This process is repeated until two rows of welds are made, the welds in each row being 1½ inches apart. Two additional rows of weld are then made after axial shifting of both electrodes in the same direction for 1½ inches, so that the resulting spot welds are on 1½ inch centers both longitudinally of the weld rows and transversely thereof.

Figure 5:
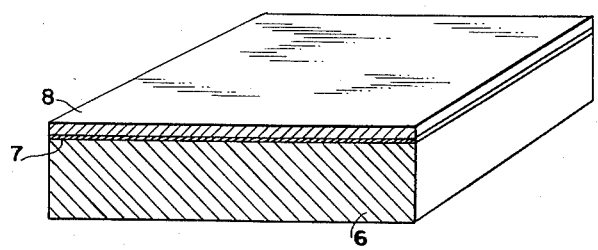
Fig. 5 is a perspective view of a composite structure prepared under the method of the invention for welding together by heat and pressure.

Fig. 5 illustrates a composite article which has been prepared in accordance with the first embodiment of the invention for bonding or welding of the liner to the base metal by other means than electric resistance welding. The liner and base in this embodiment are of the same metal as described with respect to the first embodiment. Thus the upper surface of base plate 6 has been thoroughly cleaned as by pickling. Immediately thereafter the cleaned surface of base plate 6 is shown as coated with nickel 7 which has been accomplished by electrolytic deposition of the nickel completely over the upper surface of base plate 6. Liner sheet 8 after being thoroughly cleaned is then laid flatwise on top of plated nickel layer 7 and the composite article is then ready to be secured together by various methods, not shown, in the drawing. Thus, for example, the composite article of Fig. 5 may be placed in a furnace and raised to a temperature in the range of about 1400° F. to 2000° F. and then pressure may be applied to the article by rollers, hydraulic or pneumatic means to bond and weld the liner 8 to the base metal 6. Pressure also may be applied by weight or a vacuum may be employed between the line 8 and base 6 to accomplish bonding of the liner to base 6. In the case of furnace heating, it is desirable to seal the edges of the composite structure and either draw a vacuum for the space between the liner 8 and the deposited layer 7 or introduce an inert or reducing gas into this space prior to welding.

In the electric resistance welding of the liner to the base metal as illustrated in the first embodiment of the invention heat and pressure are applied to bond the members together with the heat being supplied by electric current. In the second embodiment the heat is applied externally rather than through heating the parts by electric current. The pressure as described with respect to the second embodiment may be applied in various forms and may be supplied by rollers corresponding to the rollers employed in electric resistance welding.

Whether the liner be welded to the base metal by electric resistance welding or by the application of external heat and pressure the electro deposited nickel layer between the liner and base metal functions the same in maintaining the base metal clean and free of oxidation prior to the spot welding or pressure welding operations. The nickel or cobalt deposit readily alloys with both the base plate and the liner to provide a welded article which has greatly increased strength at the bond areas as compared to former structures.

Various modes of carrying out the invention are contemplated as being within the scope of the following claims particularly pointing out and distinctly claiming the subject matter which is regarded as the invention.

I claim:

1. A method of bonding a carbon steel base plate and a relatively thin liner sheet, said liner sheet being formed of a metallic material selected from the group consisting of stainless steel, nickel, nickel alloys, copper and copper alloys, which comprises electroplating a thin layer of a metal selected from the group consisting of nickel and cobalt on one surface of the steel base plate immediately after said base plate has been cleaned and before oxidation of said surface, placing the liner sheet in flatwise engagement with the layer of said metal, and spot welding the liner sheet and the plated base plate together at closely spaced locations, the layer of said metal protecting the surface of said base plate against oxidation after cleaning and prior to welding of the base plate and liner sheet to improve the bond strength of the spot welds between the base plate and liner sheet.

2. A method of bonding a liner sheet to a carbon steel base plate of substantially greater thickness, said liner sheet being formed of a metallic material selected from the group consisting of stainless steel, nickel, nickel alloys, copper and copper alloys, which comprises cleaning a surface of the base plate and immediately thereafter and before oxidation of the cleaned surface electroplating a thin layer of a metal on said cleaned surface to a thickness of approximately .005 inch with said metal being selected from the group consisting of nickel and cobalt, placing the liner sheet in flatwise engagement with the layer of said metal, and then applying heat and pressure to the liner sheet and plated base plate to weld the liner sheet and the plated base plate together, said layer of electroplated metal improving the bond strength between the base plate and the liner sheet when they are welded together.

References Cited in the file of this patent

UNITED STATES PATENTS

| | | |
|---|---|---|
| 1,615,585 | Humphries | Jan. 25, 1921 |
| 1,792,082 | Fink | Feb. 10, 1931 |
| 1,998,496 | Fiedler | Apr. 23, 1935 |
| 2,015,173 | Andrus | Sept. 24, 1935 |
| 2,147,407 | Huston | Feb. 14, 1939 |
| 2,214,002 | Trainer | Sept. 10, 1940 |
| 2,219,352 | Andrus | Oct. 29, 1940 |
| 2,471,663 | Tietz | May 31, 1949 |
| 2,691,815 | Boessenkool | Oct. 19, 1954 |

OTHER REFERENCES

Metals Handbook, 1948 edition, published American Society for Metals, pp. 717, 718 and 1106–1108.